(12) United States Patent
Lewis

(10) Patent No.: US 9,207,747 B2
(45) Date of Patent: Dec. 8, 2015

(54) METHOD AND DEVICE FOR ADVANCED CONFIGURATION AND POWER INTERFACE (ACPI) SLEEP-STATE SUPPORT USING CPU-ONLY RESET

(71) Applicant: Insyde Software Corp., Taipei (TW)

(72) Inventor: Timothy A. Lewis, El Dorado Hills, CA (US)

(73) Assignee: INSYDE SOFTWARE CORP., Taipei (TW)

( * ) Notice: Subject to any disclaimer, the term of this patent is extended or adjusted under 35 U.S.C. 154(b) by 451 days.

(21) Appl. No.: 13/659,353

(22) Filed: Oct. 24, 2012

(65) Prior Publication Data

US 2014/0115364 A1 Apr. 24, 2014

(51) Int. Cl.
*G06F 1/32* (2006.01)
*G06F 9/44* (2006.01)

(52) U.S. Cl.
CPC ............... *G06F 1/3246* (2013.01); *G06F 1/32* (2013.01); *G06F 9/4418* (2013.01); *Y02B 60/32* (2013.01)

(58) Field of Classification Search
CPC ....... G06F 1/32; G06F 1/3246; G06F 9/4418; Y02B 60/32
See application file for complete search history.

(56) References Cited

U.S. PATENT DOCUMENTS

| | | | | |
|---|---|---|---|---|
| 6,360,327 | B1 * | 3/2002 | Hobson | 713/300 |
| 6,895,515 | B1 * | 5/2005 | Yamazaki | 713/300 |
| 8,245,055 | B2 * | 8/2012 | O'Shea | 713/300 |

* cited by examiner

*Primary Examiner* — Jaweed A Abbaszadeh
*Assistant Examiner* — Terrell Johnson
(74) *Attorney, Agent, or Firm* — McCarter & English, LLP; John S. Curran

(57) ABSTRACT

A mechanism for firmware to gain control from the operating system of an Advanced Configuration and Power Interface (ACPI)-compliant computing device during sleep-state transitions even if the computing device lacks a dedicated means for such a change to occur is discussed. Embodiments of the present invention report a CPU-only reset register in place of a sleep control register for an ACPI-compliant computing device in which an operating system is attempting a sleep-state transition. A CPU reset value is substituted for a sleep type value in a sleep-state object and written to the CPU-only reset register that was reported instead of the sleep control register thereby triggering a CPU-only reset. Firmware code operating at a known CPU reset vector may perform specified processing and then authorize a transition to the originally requested sleep-state.

19 Claims, 4 Drawing Sheets

METHOD AND DEVICE FOR ADVANCED CONFIGURATION AND POWER INTERFACE (ACPI) SLEEP-STATE SUPPORT USING CPU-ONLY RESET

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including but not limited to ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security reasons. For example, firmware may be used to provide key error fixes, updates, work-arounds for issues such as those affecting a particular sleep-state for the computing device or to provide additional functionality to the computing device. The changes may be made by the firmware instead of the OS as access to the firmware may be restricted and the changes can therefore be implemented in a more secure manner than when the OS has control of the computing device.

A computing device may contain one or more elements known as Central Processing Units (CPUs). These CPUs may have a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the memory locations allocated for SMM. The CPU may be directed to transition from normal operating mode to SMM by a number of triggers called System Management Interrupts (SMI) events. The exact triggers available differ somewhat from among system designs but the result of an SMI being triggered is that execution in main memory is immediately suspended and execution begins at a specific location in SMM memory.

Conventionally one technique for utilizing firmware to implement changes to a computing device has made use of SMM. For example, computing platforms may be configured so that a transition to a sleep-state by the OS causes an SMI to be generated by noting when a sleep register for the computing device is written to by the OS. The firmware code running in SMM may be written so as to perform special processing before performing the requested sleep transition. Functional equivalents to SMM such as TrustZone on an Advanced/Acorn RISC Machine (ARM) processor could also be utilized in this manner. In other conventional approaches, the portion of the operating system that provides the final sleep-state transition may provide a dedicated call-out to a firmware provided function. However, all of these conventional techniques require that the computing platform support a dedicated means for the change to occur before they can be utilized such as specific firmware function calls, SMM or an equivalent mode of operation.

BRIEF SUMMARY

Embodiments of the present invention provide a mechanism for firmware to gain control from the operating system of an Advanced Configuration and Power Interface (ACPI)-compliant computing device during sleep-state transitions even if a computing device lacks a dedicated means such as SMM for such a change to occur. Embodiments of the present invention report a CPU-only reset register in place of a sleep control register for an ACPI-compliant computing device in which an operating system is attempting a sleep-state transition. A CPU reset value is substituted for a sleep type value in a sleep-state object and written to the CPU-only reset register that was reported instead of a sleep control register. The writing of the CPU reset value triggers a CPU-only reset. Firmware code operating at a known CPU reset vector may perform specified processing and then authorize a transition to the originally requested sleep-state.

In one embodiment, a computer-implemented method for providing ACPI sleep-state support in a computing device equipped with a central processing unit (CPU) includes triggering a CPU-only reset for the computing device as a result of an operating system for the computing device determining to enter a specified sleep-state. The CPU-only reset is triggered for the computing device instead of the computing device immediately entering into the specified sleep-state. The method further executes firmware code based on the triggered CPU-only reset. At the end of execution of the firmware code, the method enables the computing device to enter the specified sleep-state.

In another embodiment, a computing device equipped with a CPU and providing ACPI sleep-state support includes a Fixed ACPI Description Table (FADT). The FADT is populated with an I/O address of a CPU reset register in place of an I/O address of a sleep control register. The computing device also includes a Differentiated System Description Table (DSDT) populated with at least one sleep-state object holding a CPU reset value that when written to a CPU reset register will force a CPU-only reset. The computing device further includes an operating system that determines to enter a specified sleep-state. A CPU-only reset is triggered as a result of the determination to enter the specified sleep-state instead of the computing device immediately entering into the specified sleep-state. The computing device also includes firmware code that executes based on the triggered CPU-only reset.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
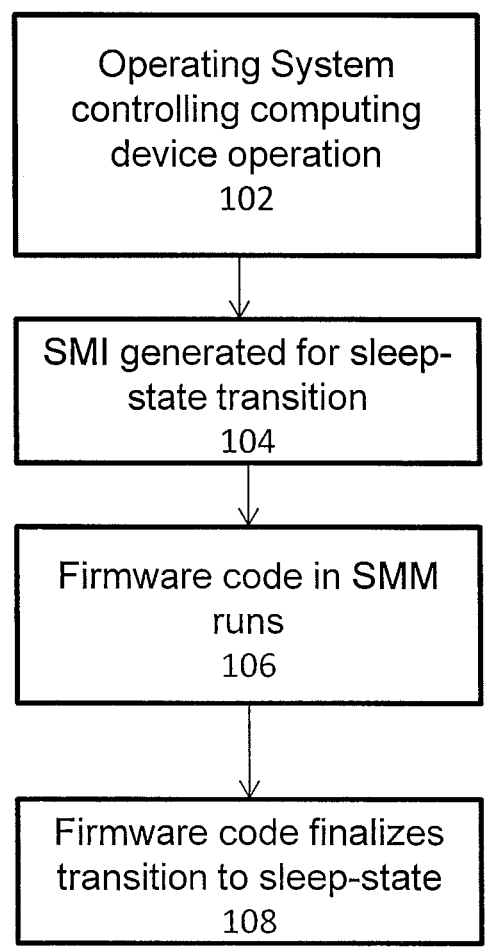
FIG. 1 (prior art) depicts an exemplary sequence of steps executed by a conventional process to trigger a System Management Interrupt (SMI) to cause the execution of firmware on sleep-state transitions in a computing device.

Conventional mechanisms for transitioning a computing device to firmware control from operating system control have relied on specialized hardware support such as support for SMM. For example, in some systems the chipsets provide the capability to generate SMIs on each sleep-state transition. FIG. 1 (prior art) depicts an exemplary sequence of steps executed by such a conventional process to trigger a SMI to cause the execution of firmware in a sleep-state transition. The sequence begins with the operating system for the computing device controlling the operation of the computing device (step 102). An SMI is then generated based upon the decision to transition between sleep-states (step 104). For example, the platform may trap on the sleep register which is written to by the OS. Many chipsets provide a means whereby instead of transitioning immediately to the sleep state when the ACPI-defined sleep register is written, an interrupt is generated. In this case, control is then given to firmware code that handles the particular SMI in SMM (step 106). After the code is finished with its processing, the firmware code may finish the transition to the originally requested sleep-state (step 108). Such a process however requires the existence of both SMM and the trapped register.

The embodiments of the present invention enable an ACPI-compliant computing device lacking special hardware support such as support for SMM to turn operation of the computing device over to firmware upon initiation of a sleep-state transition by the operating system. By re-formulating ACPI supported tables utilized by the operating system in making sleep-state transitions, the operating system can operate in its normal fashion unaware of the firmware involvement when a transition to a particular sleep-state is required.

The ACPI specification defines a standard for device configuration and power management to be implemented by the operating system (OS) in computing devices. As part of its power management standard, the ACPI specification defines six basic system power states or "sleep-states" ranging from S0(on) to S5 (off). The sleep-states describe gradually greater degrees of power savings and greater lengths of time needed to make the system available to a user. For example a computing device in an S3 power state is saving more power than a computing device in an S1 state while a system in an S5 state requires more time to respond to a user input command than a system in an S3 power state. In an ACPI-compliant computing device, an operating system controls the transition of the computing device between sleep-states by writing a specific "sleep value" to a sleep register.

The six sleep-states defined by the ACPI specification are:
S0: On (not sleeping)
S1: The S1 sleeping state is a low wake latency sleeping state. In this state, no system context is lost (CPU or chipset) and hardware maintains all system context.
S2: The S2 sleeping state is a low wake latency sleeping state. This state is similar to the S1 sleeping state except that the CPU and system cache context is lost (the OS is responsible for maintaining the caches and CPU context). Control starts from the processor's reset vector after the wake event.
S3: The S3 sleeping state is a low wake latency sleeping state where all system context is lost except system memory. CPU, cache, and chipset context are lost in this state. Hardware maintains memory context and restores some CPU and L2 configuration context. Control starts from the processor's reset vector after the wake event.
S4: The S4 sleeping state is the lowest power, longest wake latency sleeping state supported by ACPI. In order to reduce power to a minimum, it is assumed that the hardware platform has powered off all devices. Platform context is maintained.
S5: Soft Off State. The S5 state is similar to the S4 state except that the OS does not save any context. The system is in the "soft" off state and requires a complete boot when it wakes. Software uses a different state value to distinguish between the S5 state and the S4 state to allow for initial boot operations within the BIOS to distinguish whether or not the boot is going to wake from a saved memory image.

In an ACPI-compliant computing device a "sleep control register" is an I/O register defined in a Fixed ACPI Description Table (FADT). A FADT is an ACPI-defined table which describes a number of fixed hardware resources, including a Sleep Control Register. The ACPI specification defines two different types of sleep control registers: PM1 Control (section 4.8.1) and Sleep Control (section 4.8.3.7). The former is used when the system is not classified as hardware-reduced (see HW_REDUCED_ACPI, table 5-35) and the latter is used when the system is classified as hardware-reduced. Conventionally, in order to trigger a sleep-state transition, the operating system checks the address of a sleep control register defined in the FADT and writes a sleep type value associated with a desired sleep-state to the address. As will be explained further below, the embodiments of the present invention alter the address of the Sleep Control Register defined in the FADT.

The ACPI specification defines different values that should be written to the SLP_TYP field of the PM1 Control or Sleep Control register, based on which sleep-state the operating system desires to transition to. The operating system retrieves these values from the _Sx ACPI object in which x is the sleep-state desired (hereafter "sleep-state objects"). The sleep-state objects are stored in a Differentiated System Description Table (DSDT). A DSDT is an ACPI-defined table which contains interpreted instructions (called ACPI Machine Language or AML), including data objects and methods. The operating system interprets these instructions. Some methods have pre-defined meaning within ACPI. As will be explained further below, the embodiments of the present invention alter the sleep type values stored in the sleep state objects in the DSDT.

One of the methods stored in the DSDT is the "Prepare to Sleep Method" or _PTS method which is an ACPI defined interpreted function call that is invoked by the operating system, but provided by the firmware. This method is called when the operating system is preparing to make a sleep-state transition but before doing anything else in the process. The _PTS is usually used to perform board-specific tasks to prepare the hardware platform for a specific sleep state. As will be explained further below, the embodiments of the present invention alter the _PTS method stored in the DSDT.

Figure 2:
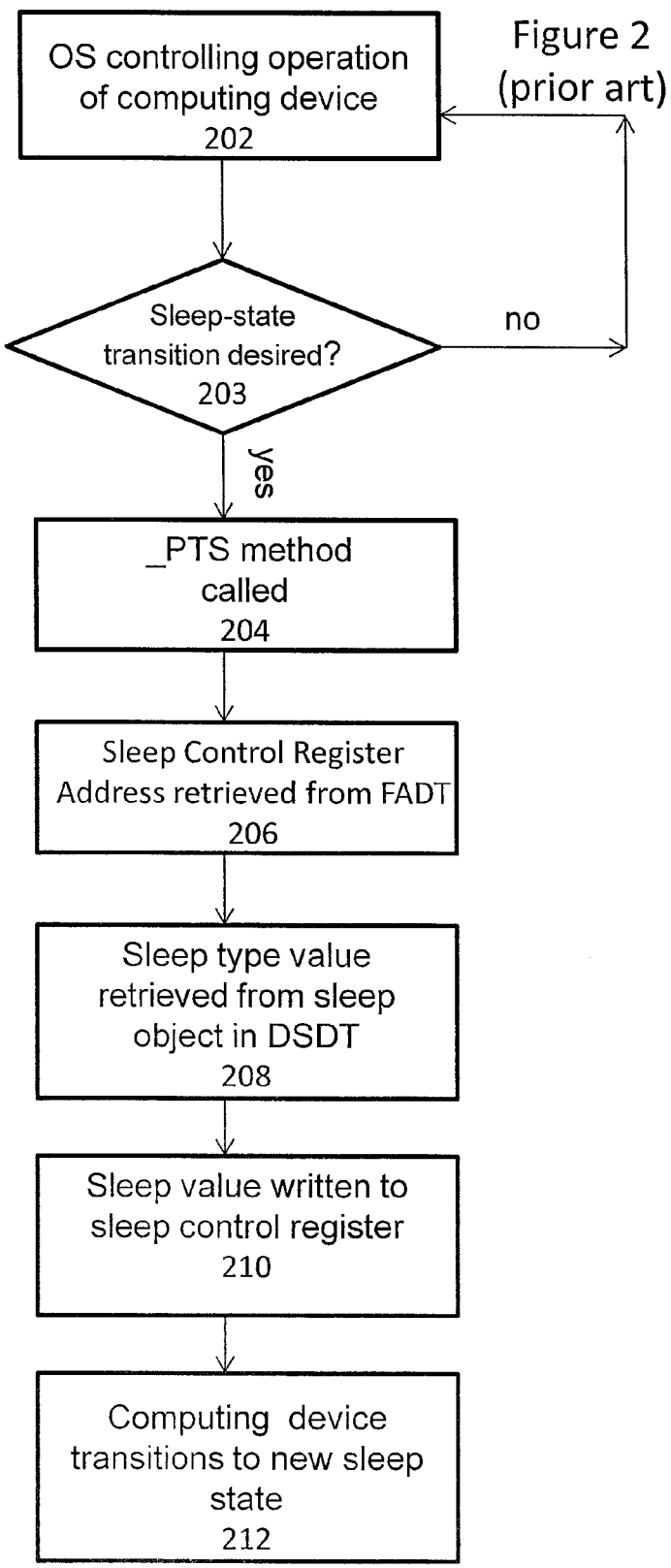
FIG. 2 (prior art) depicts the ordinary process by which an operating system transitions between sleep-states in an ACPI-compliant computing device.

FIG. 2 (prior art) depicts the ordinary process by which an operating system transitions between sleep-states in an ACPI-compliant computing device. During normal operation (step 202), the OS reaches a determination that the computing device should transition between sleep-states (step 203). This determination may be reached as a result of user input, for example a user pressing a power button, or may be programmatically generated such as the OS noting the passage of time since the last received input or another policy. As a result of the transition determination the OS may call the prepare to sleep (_PTS) method stored in the DSDT table (step 204). The sleep control register address may be retrieved from the FADT by the OS (step 206) and the sleep type value from a sleep-state object in the DSDT that corresponds to the OS's desired sleep-state (step 208). Both the DSDT and FADT may have been previously loaded into main memory from BIOS at the time of system startup. The sleep type value is written to the sleep control register by the operating system (step 210). The chipset (or other silicon component which implements this register) detects the write to the sleep control register and initiates the computing device's transition to the desired new sleep-state (step 212).

Figure 3:
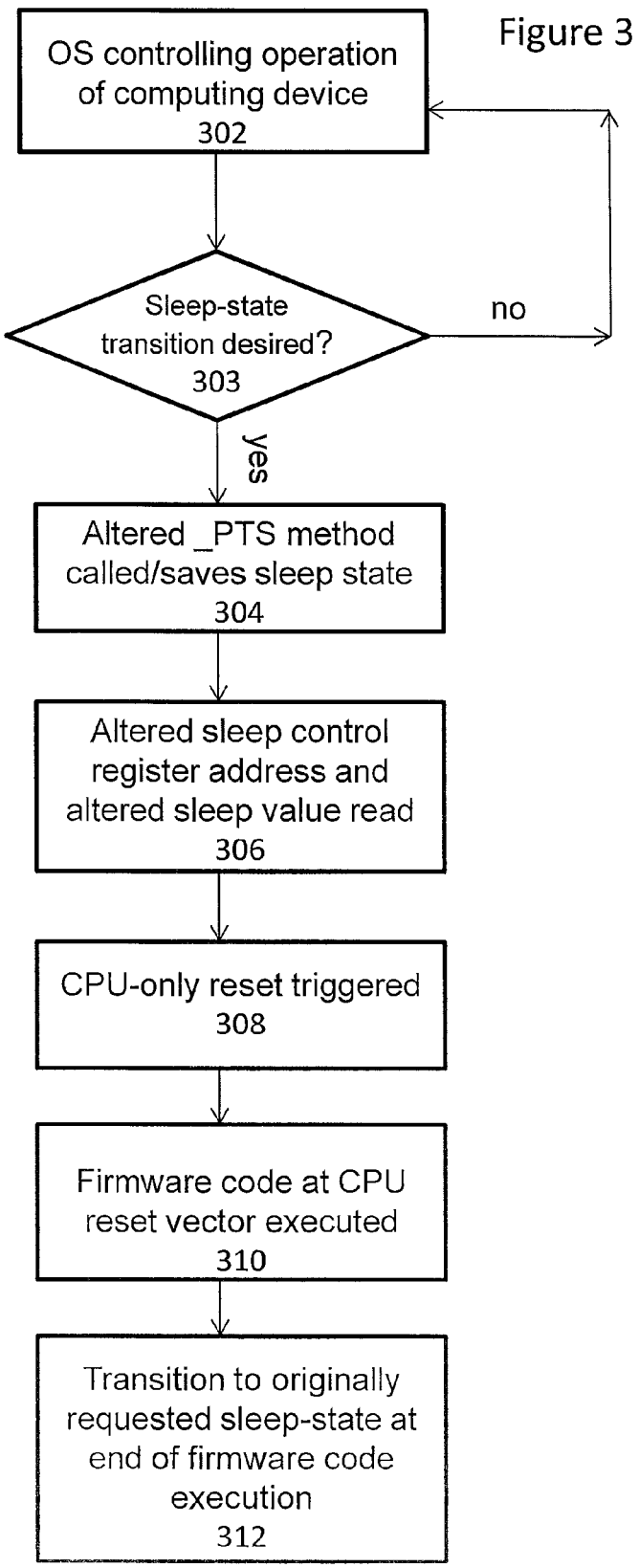
FIG. 3 depicts an exemplary sequence of steps for an exemplary embodiment of the present invention to execute firmware in advance of a sleep-state transition in an ACPI-compliant computing device not supporting System Management Mode (SMM)

In contrast to the process described in FIG. 2, the embodiments of the present invention redirect the normal sleep-state transition sequence by altering the FADT and DSDT tables defined in the ACPI specification that are utilized by the operating system. FIG. 3 depicts an exemplary sequence of steps for an exemplary embodiment of the present invention to execute firmware in advance of a sleep-state transition in an ACPI-compliant computing device not supporting SMM. The sequence begins with the operating system controlling operation of the computing device (step 302) and reaching a determination to transition between sleep-states (step 303). At this point an altered _PTS method is called which records the sleep-state which the operating system wants to transition to in non-volatile storage (step 304). Non-volatile storage may include any storage that will survive a CPU-only reset (discussed below). This may include battery-backed SRAM (such as the PC architecture's CMOS) or system RAM, which will survive a CPU-only reset. The altered _PTS method may be provided by firmware. The first argument of the _PTS method may indicate the desired sleep-state (0=S0, 1=S1, ... 5=S5).

The embodiments of the present invention substitute the address of a CPU reset register in the FADT table in place of the address of the sleep control register. Depending on the platform configuration, this might be the PM1 Control register or Sleep Control register. The Sleep Status Register is set to the same value as the Sleep Control Register, if necessary. Typical values for the altered Sleep Control Register might be 0xcf9 or 0x92, corresponding to well-known PC Architecture addresses of CPU reset registers. Similarly, the sleep state objects in the DSDT table are populated with a CPU reset value in place of the normal sleep type values. A CPU reset value written to a CPU reset register causes a CPU-only reset. A CPU-only reset is a form of reset where the CPU resets to its default power-on condition and begins execution at the default address, but none of the other devices in the system (PCI, core logic, etc.) are reset. In a CPU-only reset, all memory contents are preserved and all chipset settings remain intact. The default address or CPU reset vector is a well-known address. In many embodiments, the altered values populating the respective sleep-state objects in the DSDT are the same for all sleep-states. Hereafter the CPU reset register stored in the FADT shall be referred to as the "altered sleep control register" and the CPU reset value stored in the DSDT shall be referred to as an "altered sleep type value." As noted above, the FADT and DSDT are loaded into memory at the onset of the computing device's operation.

Following the calling of the altered _PTS method, the operating system attempts to read the sleep control register address and sleep type value from the FADT table and DSDT table respectively. However, as the sleep control register address and the sleep type value have been replaced with altered versions the operating system unknowingly reads the altered sleep control register and altered sleep type value (step 306). The operating system reads the altered Sleep Control Register address from either the PM1a Control, PM1b Control or Sleep Control fields in the FADT. The operating system reads the altered Sleep Type value from the appropriate _Sx object provided by the firmware through the DSDT. For S1, the object is _S1. For S3, the object is _S3, etc. When the operating system completes its processing and writes the altered sleep type value to the altered sleep control register (i.e. the CPU reset value is written to the CPU reset register). Depending on the exact nature of the altered Sleep Control register, the operating system may proceed to write to the SLP_EN bit of the same register. A CPU-only reset is triggered by the writing of the CPU reset value to the CPU reset register (step 308). In the embodiments of the present invention firmware code operating at the CPU reset vector may then be executed (step 310).

The firmware code executes at the CPU reset vector soon after the CPU begins execution at the CPU reset vector. This code may execute both during a normal reset, power-on event or CPU-only reset. The firmware code may distinguish normal reset conditions from sleep-state transitions induced by the embodiments of the present invention. One way to distinguish between reset conditions is to examine the non-volatile storage location to see if it contains a signature or non-default value. This can be performed in such a way as to be unique to the execution path described. For example the _PTS method may also write a special signature, which is then cleared by the execution of the firmware code. It will be appreciated that other possible methods of detecting the operating system sleep-state transition as described herein may be utilized and are within the scope of the present invention. If the firmware code determines that the CPU reset is a normal reset condition and therefore not caused by a sleep-state transition of the present invention, the firmware may proceed with executing a normal boot process.

Alternatively, if it is determined that the CPU-only reset was a special reset triggered by an embodiment of the present invention the firmware code may determine if any special task is to be performed on this type of sleep-state transition. For example, special behavior, such as work-arounds for known power-management bugs or special features, such as diagnostics may be performed depending upon which sleep-state had been specified. At the end of the execution of the firmware code associated with the specified sleep-state, the firmware code may transition the system into the original desired sleep-state by writing the actual Sleep Type value (retrieved from non-volatile storage) into the actual Sleep Control Register and then set the SLP_EN bit in the Sleep Control Register to begin the transition (step 312). In other cases, the platform hardware does not need to actually support the sleep-state requested. Instead all that is desired is an orderly transition into the firmware where the firmware performs some task. In this case, during the resume process, the firmware performs its desired activity and then continues in the normal process to return to the OS.

It should be appreciated that the embodiments of the present invention will not support a sleep-state transition to the S1 sleep-state. The reason for the lack of support of transition to the S1 sleep-state is that, unlike transitions to S2-S5 sleep-states, the sleep-state transition to S1 is designed to stay inside the operating system. Since the embodiments of the present invention require a CPU-only reset and there is no means to "return" to the location where the operating system wrote to the register, S1 cannot be supported.

It should further be noted that hardware resources available when performing normal S3/S4/S5 sleep-state transitions may not be unlocked or available when the transitions controlled by the embodiments of the present invention take place if the unlocking of those registers depends on a PCI reset or power-on signal. For example, some flash devices can be locked so that their configuration cannot be updated until the next PCI reset. These devices would not be unlocked by the embodiments of the present invention in which a CPU-only reset is performed. Likewise, memory controller registers that get locked would not be unlocked by the CPU-only reset.

Figure 4:
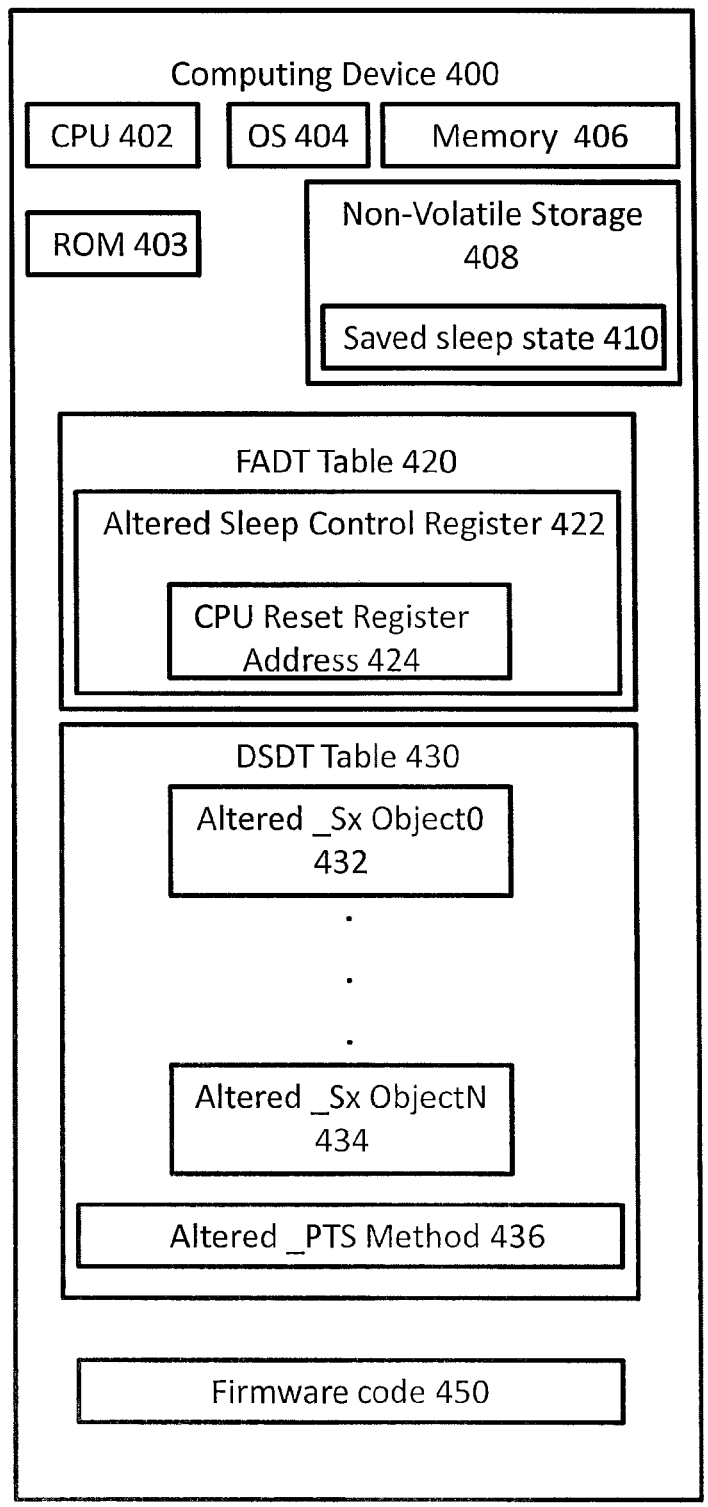
FIG. 4 depicts an exemplary environment suitable for practicing embodiments of the present invention.

FIG. 4 depicts an exemplary environment suitable for practicing the embodiments of the present invention. An exemplary computing device 400 is equipped with a CPU 402, ROM 403, operating system (OS) 404, memory 406, such as Random Access Memory (RAM) and non-volatile storage 408 such as a hard drive, flash ROM, CMOS or other non-volatile storage location. The computing device 400 may be a tablet computing device, cell phone, smart phone, PDA, laptop, netbook, desktop computer, mobile computing device or other computing device. Computing device 400 includes firmware code 450 responsible for device initialization and for initially loading the OS 404 into memory. Firmware code 450 also includes firmware code configured to execute at the CPU-reset vector as described above. Computing Device 400 additionally includes an FADT table 420 holding an altered sleep control register 422 populated with the address of the CPU reset register 424. The DSDT table 430 includes a number of altered sleep state objects _Sx0 . . . _SxN holding altered sleep type values which correspond to a CPU reset value. The DSDT table 430 may also hold an altered _PTS method 436 which may store a sleep-state 410 specified by the OS in non-volatile storage 408 upon the OS determination of a sleep-state transition in the manner described above.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computer-implemented method for providing Advanced Configuration and Power Interface (ACPI) sleep-state support in a computing device equipped with a central processing unit (CPU), comprising:
   triggering a CPU-only reset for the computing device as a result of an operating system for the computing device determining to enter a specified sleep-state, the CPU-only reset triggered for the computing device instead of the computing device immediately entering into the specified sleep-state, the CPU-only reset using an I/O address of a CPU reset register that populates an ACPI-defined tables in place of an I/O address of a sleep control register;
   executing firmware code based on the triggered CPU-only reset; and
   entering the specified sleep-state at an end of execution of the firmware code.

2. The method of claim 1 wherein the ACPI-defined table is a Fixed ACPI Description Table (FADT).

3. The method of claim 1, further comprising:
   populating a Differentiated System Description Table (DSDT) with at least one sleep-state object holding a CPU reset value that when written to the CPU reset register forces a CPU-only reset.

4. The method of claim 1, further comprising:
   invoking, with the operating system, a prepare to sleep method held by the DSDT based on the determining, the prepare to sleep method saving the specified sleep-state in a non-volatile memory.

5. The method of claim 1, wherein the firmware code executes at a CPU reset vector on every CPU-only reset for the computing device.

6. The method of claim 5 wherein the firmware code distinguishes between a CPU-only reset caused by an attempted sleep-state transition by the operating system and other types of CPU resets.

7. The method of claim 1 wherein the entering of the specified sleep-state further comprises:
   the firmware code writing a sleep-state value corresponding to the specified sleep-state to the sleep control register and setting a SLP_EN bit in the sleep control register to begin a transition to the specified sleep-state.

8. A non-transitory medium holding computer-executable instructions for providing Advanced Configuration and Power Interface (ACPI) sleep-state support in a computing device equipped with a central processing unit (CPU), the instructions when executed causing the computing device to:
   trigger a CPU-only reset for the computing device as a result of an operating system for the computing device determining to enter a specified sleep-state, the CPU-only reset triggered for the computing device instead of the computing device immediately entering into the specified sleep-state, the CPU-only reset using an I/O address of a CPU reset register that populates an ACPI-defined table in place of an I/O address of a sleep control register;
   execute firmware code based on the triggered CPU-only reset; and
   enter the specified sleep-state at an end of execution of the firmware code.

9. The medium of claim 8 wherein the ACPI-defined table is a Fixed ACPI Description Table (FADT).

10. The medium of claim 8 wherein a Differentiated System Description Table (DSDT) is populated with at least one sleep-state object holding a CPU reset value that when written to the CPU reset register forces a CPU-only reset.

11. The medium of claim 8 wherein a prepare to sleep method held by the DSDT is invoked by the operating system based on the determination to enter the specified sleep state, the prepare to sleep method saving the specified sleep-state in a non-volatile memory.

12. The medium of claim 8 wherein the firmware code executes at a CPU reset vector on every CPU-only reset for the computing device.

13. The medium of claim 12 wherein the firmware code distinguishes between a CPU-only reset caused by an attempted sleep-state transition by the operating system and other types of CPU resets.

14. The medium of claim 8 wherein the execution of the instructions at an end of the execution of the firmware code further causes the computing device to:
   write a sleep-state value corresponding to the specified sleep-state to the sleep control register and set a SLP_EN bit in the sleep control register to begin a transition to the specified sleep-state.

15. A computing device equipped with a central processing unit (CPU) and providing Advanced Configuration and Power Interface (ACPI) sleep-state support, comprising:
   a Fixed ACPI Description Table (FADT) in the computing device populated with an I/O address of a CPU reset register in place of an I/O address of a sleep control register;
   a Differentiated System Description Table (DSDT) populated with at least one sleep-state object holding a CPU reset value that when written to a CPU reset register will force a CPU-only reset;
   an operating system for the computing device, the operating system determining to enter a specified sleep-state, a CPU-only reset triggered as a result of the determination to enter the specified sleep-state instead of the computing device immediately entering into the specified sleep-state; and
   firmware code executed based on the triggered CPU-only reset.

16. The computing device of claim 15 in which the specified sleep-state is entered at an end of the execution of the firmware code.

17. The computing device of claim 16 in which a prepare to sleep method in the DSDT is called by the operating system and saves the specified sleep-state in a non-volatile memory prior to triggering the CPU-only reset.

18. The computing device of claim 15 in which the firmware code distinguishes between a CPU-only reset caused by an attempted sleep-state transition by the operating system and other types of CPU resets.

19. The computing device of claim 15 in which at an end of the execution of the firmware code a sleep-state value corresponding to the specified sleep-state is written to a sleep control register and a SLP_EN bit in the sleep control register is set in order to begin a transition to the specified sleep-state.

* * * * *